Oct. 27, 1925.  
J. G. COFFIN  
TESTING MACHINE  
Filed Jan. 11, 1924  
1,558,594
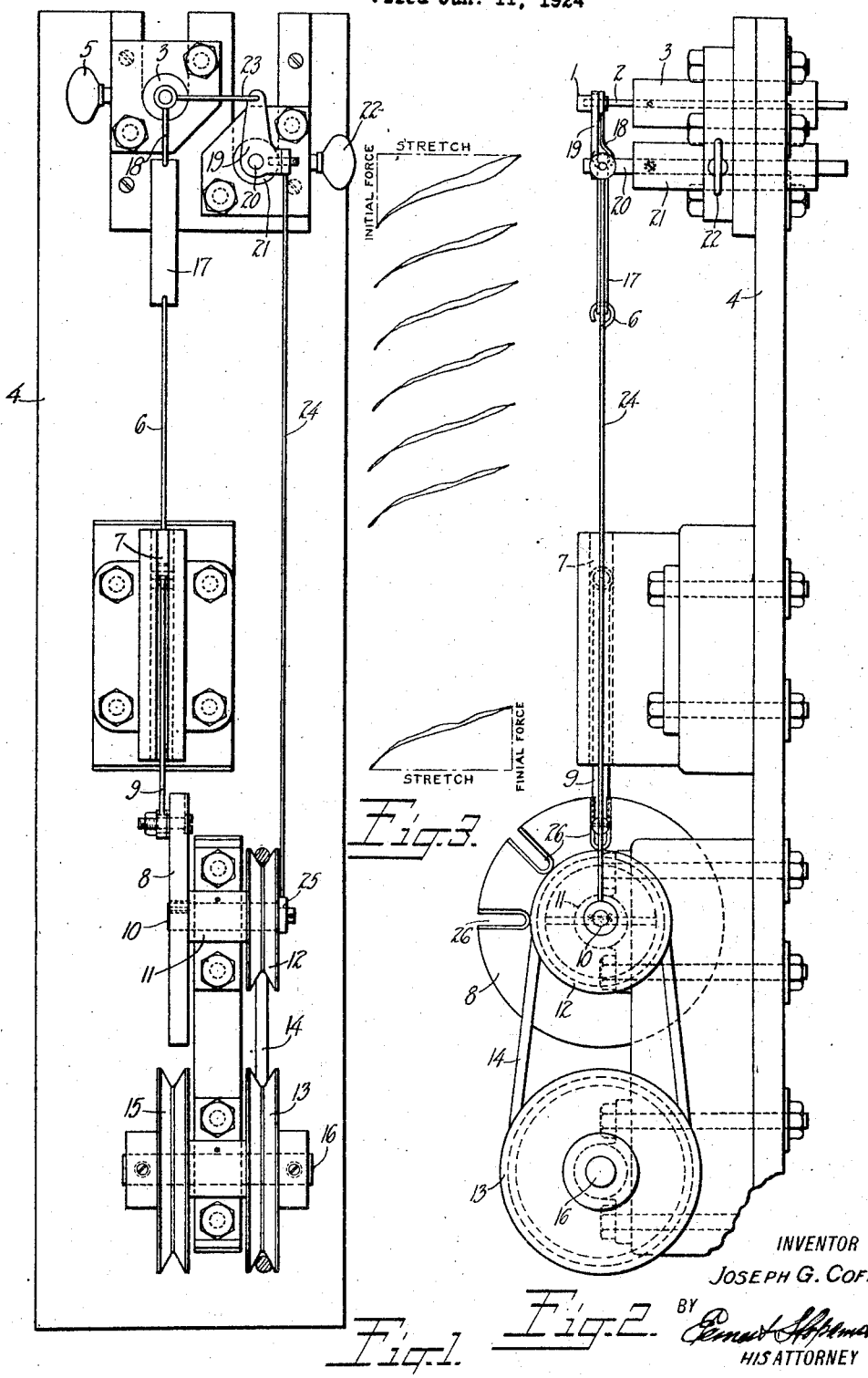
INVENTOR  
JOSEPH G. COFFIN  
BY  
HIS ATTORNEY Patented Oct. 27, 1925.

1,558,594

UNITED STATES PATENT OFFICE.

JOSEPH G. COFFIN, OF HEMPSTEAD, NEW YORK, ASSIGNOR TO L. CANDEE & COMPANY, OF NEW HAVEN, CONNECTICUT, A CORPORATION OF CONNECTICUT.

TESTING MACHINE.

Application filed January 11, 1924. Serial No. 685,509.

*To all whom it may concern:*

Be it known that I, JOSEPH G. COFFIN, a citizen of the United States, and residing at Hempstead, county of Nassau, and State of New York, have invented certain new and useful Improvements in Testing Machines, of which the following is a full, clear, and exact description.

This invention relates to testing machines and more particularly to a machine for testing elastic materials that may be stretched such for instance as vulcanized rubber, and has for its principal object the devising of means recordably operable to respond in part to the action imparted to the specimen whereby the irregularities in such action may be recorded thereby affording means for investigating the characteristics of the specimen as exhibited when under the action imparted to it.

In the preferred embodiment means are provided for stretching the test specimen and permitting it to unstretch with any desired rapidity within reasonable limits in a manner to produce a uniform amount of stretch throughout the test, or any part thereof, which may proceed until the breaking point is reached whereby a record may be made responsive to the change in force exerted by the rubber and to the irregularities in the action of the specimen as it stretches and unstretches, the specimen for this purpose being connected to the recordable member whereby its recordable operation will be in part due to the action of the specimen.

In the drawings forming a part of this specification,

Fig. 1 is a front elevation of the machine,
Fig. 2 is a side elevation thereof, and
Fig. 3 illustrates a record taken of the action of a specimen being tested.

In the preferred embodiment of the invention a recordably operable member is provided that may be simultaneously operated by a plurality of means whereby the resultant operation may be recorded. This operation is in part due to the action induced in a test specimen of the material to be tested whereby the resultant recordable operation will be in part dependent upon the action of the specimen.

The resultant operation of the member is preferably made recordable indirectly by providing a member capable of transmitting a beam of light, the most preferred embodiment employing a member adapted to reflect the beam of light. While a member could be chosen within the limits of the invention whose resultant operation would be recordable in any desired manner as above set forth, as for instance indirectly by transmitting a beam of light in any desired manner, it is shown in the drawings as a mirror 1 which is adapted to transmit a beam of light that may be projected upon it by reflection as will later more fully appear.

While the invention contemplates the employment of a plurality of means for operating the member the scope thereof does not limit the means as to the manner of effecting the operation of the member. In the present embodiment, however, the plurality of means operate the member by imparting to it a reciprocatory motion. Each of the means tends to impart to the member a reciprocatory motion in a different direction or plane whereby the resultant reciprocatory motion is produced. In the preferred embodiment as shown in the drawings the member by the reciprocatory motion imparted to it is deflected to and from its initial position each of the means tending to deflect the member to and from initial position in different directions or planes whereby a resultant deflection will be produced. This resultant reciprocatory motion of the member or preferably the resultant deflection to and from initial position of the member is recordable preferably indirectly by the transmission or more specifically the reflection therefrom of a beam of light projected thereon.

To permit the member to be thus deflected it is preferably mounted on or secured to a rod 2 which will be bent or deflected with the member 1 when subjected to the operation of the plurality of means. The rod is preferably made flexible to permit of its bending from and returning to initial position and is anchored at one end in a block 3 which is secured to the frame or support 4 by means of a set screw 5.

One of the means for operating the member 1 comprises a rod 6 which is connected to a cross-head 7. The cross-head is connected to a crank wheel 8 by means of the crank shaft 9. The wheel 8 is secured on a shaft 10 mounted in the bearing 11, the shaft having secured on its opposite end a drive wheel 12. This wheel is connected to wheel 13 by belt 14, the wheel 13 being driven by any convenient source of power not shown which may be connected to wheel 15 secured with wheel 13 on the same shaft 16. This construction provides a simple means of reciprocating the rod 6 at any desired speed within reasonable limits. The rod 6 is connected to the rod 2 indirectly by means of a specimen of the material to be tested, as for instance the strip 17, and the rod 18 which latter operably connects the specimen to the member whereby the stretching and unstretching of the specimen will tend to reciprocate or deflect the member in one plane. The rods 6 and 18 are conveniently provided with hooks at their free ends for hooking into the specimen 17. By this means the rod 2 and member or mirror 1 are reciprocated by the rod 6 in one direction, and are returned in the opposite direction by the resiliency of the rod 2. This reciprocation is in the present instance a deflection whereby the mirror is deflected with the rod 2 to and from initial position in one plane, the deflection being dependent upon the action imparted by the operating means to the specimen 17. That is to say the deflection is dependent upon the force imparted to the specimen as it is stretched and permitted to unstretch and to the irregularities in the action of this force. This force and the irregularity of action thereof continually change as the stretching and unstretching of the specimen continues during the test.

A beam of light transmitted, as for example, by reflection would simply be reciprocated in the plane of the deflections of the mirror and would not be easily recordable for the purpose of investigating the characteristics of the specimen. That is to say the record of the operation of the member 1 would constitute but a part of the action of the specimen and to produce a record where a greater portion of the action of the specimen is recorded means are provided for changing the operation of the member that would otherwise be produced by the said specimen. There are several ways of accomplishing this, the important consideration being to provide means for diverting the member to a greater or less extent from the path it would take if operated only or freely by the stretching and unstretching of the specimen, that is to say to divert it in the present instance from its reciprocatory deflections in the line or direction of the pull of the specimen. Therefore while it is not intended to limit the invention to any one manner of accomplishing this, in the present embodiment this is accomplished by providing other means for simultaneously operating the member 1 which will tend to reciprocate or deflect it in another plane. To effect this a bell crank 19 is pivotally secured on a post 20 secured in a block 21, the block being secured to the frame or support 4 by means of a set screw 22. One arm of the bell crank 19 is secured to the rod 2 by means of the rod 23. The other arm of the bell crank is secured to a rod 24 which latter is secured to the wheel 12 by means of the eccentric connection 25. This mechanism provides a simple means of operating the member 1 by a reciprocating deflection in a different plane or direction than that of the mechanism first described. The two means for simultaneously operating the member obviously only tend to operate it in the different directions. This tendency in reality effects a resultant operation, reciprocation, or deflection of the member or mirror 1, whereby a beam of light projected on the mirror may be reflected in a manner to make it possible to investigate the characteristics of the specimen.

The operation is as follows:—A specimen 17 of the material to be tested, as for instance a sheet of vulcanized rubber, preferably in strip form as shown is provided at its opposite ends with holes and is secured thereby to the hooks of rods 6 and 18. The specimen may be, and generally will be, of a length suitable to permit of no substantial stretch when the cross-head 7 is in its extreme position as shown in Fig. 1 although the wheel 8 may be provided with one or more slots as shown for connecting the crank thereto in the usual manner to permit of adjustment to regulate the amount of stretch. The wheel 15 is driven to reciprocate rods 6 and 24 at any desired speed. The mechanism as shown reciprocates these rods at the same speed and in the same phase but obviously the eccentric 25 could be of any usual construction to permit it to be set relative to the crank pin connecting the wheel 8 with the rod 9 or the wheel 8 may be provided with a plurality of holes or slits 26 for engaging this pin whereby suitable adjustment may be made to time the operations of the two rods whereby they may operate in any desired phase.

A beam of light is projected in any usual or preferred manner upon the mirror 1 and its reflection therefrom is thrown upon a sensitized plate which may be developed in the usual way to produce a photograph of the beam. The beam is projected as often as desired but preferably at some uniform time interval so that a series of photographic reproductions of the reflected beam may be obtained.

The beam of light is projected on the mirror and is transmitted by reflection and the reflected beam photographed to produce a record of the operation, reciprocation, or deflection of the mirror which in turn is dependent upon the two operating means that have been described. And as one of these operating means operates the member to deflect it in a regular or constant manner the change or irregularities in the successive photographs of the reflected beam of light will not be due to this operating means. On the contrary, however, the other operating means operates through action induced in the test specimen of the material to be tested which is operably connected to the mirror and which action is of a variable nature. Therefore the changes or irregularities in the successive photographs of the reflected beam of light are directly due to the action of the specimen as it stretches and unstretches.

When a specimen of rubber is being tested, for instance, each exposure taken represents the complete resultant movement of the reflected beam on the sensitized sheet produced by the resultant deflection of the member from and to initial position the photograph thereby produced presenting a line of closed looped formation, seven of these loops being shown in Fig. 3. As the stretch of the specimen due to the construction of the machine is constant the distance between the ends of the loop when it changes direction, measured on the horizontal line in Fig. 3 is uniform, and for a like reason the loops are closed. The deflection of the mirror is in part due to the force of the pull of the specimen. This force diminishes as the stretching and unstretching proceeds and the specimen thereby becomes weakened. This change in force will be recorded in the photograph and is indicated by the distance between the beginning of the loop and the point where it starts to return, that is to say between the beginning and end of one side of the loop as measured on the vertical. It will be found that as the specimen gradually weakens these distances will decrease in the successive loops of the photographs. Furthermore as the unstretching of the specimen is not a perfect retracing of the stretching this will present an irregularity that will be recorded by the variations in the areas of the loops, the upper half of each loop denoting the stretching of the specimen and the lower half the unstretching thereof.

The specimen can be stretched and unstretched at almost any rate. The loops shown in Fig. 3 were produced by stretching and unstretching a specimen of vulcanized rubber at the rate of one thousand times a minute. The whole test of the specimen can thus be made automatically and if the temperature of the specimen is simultaneously recorded the test will give a considerable amount of information regarding the characteristics of the rubber. It will show under proper conditions:—(a) The isothermal hysteresis loop if the rubber be stretched slowly through a cycle.—(b) A series of adiabatic hysteresis loops if the rubber is stretched and unstretched at great speed as for instance a thousand or more cycles per minute indicate the testing of the specimen at temperatures up to the equilibrium temperature.—(c) Changes in the hysteresis loop due to the gradual breaking down of the rubber specimen as the test continues.—(d) The time necessary to break the sample.

It will thus be seen that the photographs afford ready means for investigating the characteristics of the specimen as exhibited when under the action imparted to it and by varying the speed of the reciprocations, or stretching and unstretching of the rubber, and varying the temperature conditions under which the tests are made much may be learned regarding the specimen tested, which may be made available in selecting the quality of material best adapted for the particular use to which it is to be put.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. In a testing machine, a recordably operable member, and a plurality of means for simultaneously operating the member whereby the resultant operation may be recorded said means effecting the resultant operation in part through action induced thereby in a test specimen of the material to be tested by subjecting the specimen to strain whereby the recordable operation will be in part dependent upon the action of the specimen.

2. In a testing machine, a recordably operable member, means for inducing action in a test specimen of the material to be tested by subjecting the specimen to strain, and other means, said means constituting a plurality of means for simultaneously operating the member whereby the resultant operation may be recorded the resultant operation being effected in part by the induced action of the specimen whereby the recordable operation will be in part dependent on the action of the specimen.

3. In a testing machine, a member operable for recordably transmitting a beam of light projected thereto, and a plurality of means for simultaneously operating the member to effect a resultant operation whereby a recordable beam of light may be transmitted said means effecting the resultant operation in part through action induced thereby in a test specimen of the material to be tested by the application of physical force thereto whereby the recordable transmitted beam of light will be in part dependent upon the action of the specimen.

4. In a testing machine, a member operable for recordably transmitting a beam of light, means for inducing action in a test specimen of the material to be tested by subjecting the specimen to strain, and other means, said means constituting a plurality of means for simultaneously operating the member to effect a resultant operation whereby a recordable beam of light may be transmitted, the resultant operation being effected in part by the induced action of the specimen whereby the recordable transmitted beam of light will be in part dependent upon the action of the specimen.

5. In a testing machine, a member operable for recordably reflecting a beam of light, and a plurality of means for simultaneously operating the member to effect a resultant operation whereby a beam of light may be recordably reflected said means effecting the resultant operation in part through action induced thereby in a test specimen of the material to be tested by the application of physical force thereto whereby the recordable reflection will be in part dependent upon the action of the specimen.

6. In a testing machine, a member operable for recordably reflecting a beam of light, means for inducing action in a test specimen of the material to be tested by subjecting the specimen to strain, and other means, said means constituting a plurality of means for simultaneously operating the member to effect a resultant operation whereby a beam of light may be recordably reflected, the resultant operation being effected in part by the induced action of the specimen whereby the recordable reflection will be in part dependent upon the action of the specimen.

7. In a testing machine, a recordably operable member, and a plurality of means for simultaneously operating the member tending to deflect it in different planes respectively whereby the resultant operation will produce a recordable deflection said means effecting the resultant operation in part through action induced thereby in a test specimen of the material to be tested by the application of physical force thereto whereby the recordable deflection will be in part dependent upon the action of the specimen.

8. In a testing machine, a member recordably deflectable, means for inducing action in a test specimen of the material to be tested by the application of physical force thereto, and other means, said means constituting a plurality of means for simultaneously tending to deflect the member in different planes respectively to effect a resultant recordable deflection, the resultant recordable deflection being effected in part by the induced action of the specimen whereby the resultant recordable deflection will be in part dependent on the action of the specimen.

9. In a testing machine, a recordably operable member, means for subjecting a specimen of the material to be tested to an application of physical force whereby the specimen will tend to operate the member in a manner to make recordable a portion of the characteristics of the action of the specimen, and means for changing the operation of the member that would otherwise be produced by the said specimen to produce an operation whereby a greater portion of the action of the specimen may be recorded.

10. In a testing machine, a member deflectable for recordably reflecting a beam of light, means for inducing action in a test specimen of the material to be tested by the application of physical force thereto, and other means, said means constituting a plurality of means for simultaneously tending to deflect the member in different planes respectively to effect a resultant deflection whereby a beam of light may be recordably reflected, the resultant deflection being effected in part by the induced action of the specimen whereby the recordable reflection will be in part dependent on the action of the specimen.

11. In a testing machine, a member deflectable for recordably reflecting a beam of light, means whereby a test specimen of the material to be tested may be stretched and unstretched including means for operably connecting said specimen to the member whereby the stretching and unstretching will tend to deflect the member and to return it to initial position respectively, and other means tending to simultaneously deflect the member in a different plane and to return it to initial position, said means constituting a plurality of means for producing a resultant deflection whereby a beam of light may be recordably reflected dependent in part upon the action of the specimen.

12. In a testing machine, a member operable for recordably reflecting a beam of light, means whereby a test specimen of the material to be tested may be stretched and unstretched including means for operably connecting said specimen to the member whereby the stretching and unstretching will tend to produce reciprocatory motion in the member in an irregular manner dependent upon the changing characteristics in the specimen being tested, and other means tending to simultaneously produce reciprocatory motion in the member in a regular manner in a different direction, said means cooperating to produce resultant reciprocatory motion whereby a beam of light may be recordably reflected in an irregular manner responsive in its irregularities to the changing characteristics of the specimen.

13. In a testing machine, a member deflectable for recordably reflecting a beam of light, means whereby a test specimen of the material to be tested may be stretched and unstretched including means for operably connecting said specimen to the member whereby the stretching and unstretching will tend to deflect the member to and from initial position in an irregular manner dependent upon the changing characteristics in the specimen being tested, and other means tending to simultaneously deflect the member to and from initial position in a regular manner in a different plane, said means cooperating to produce a resultant deflection whereby a beam of light may be recordably reflected in an irregular manner responsive in its irregularties to the irregular action of the specimen.

14. In a testing machine, a member operable for recordably reflecting a beam of light, means whereby a test specimen of the material to be tested may be stretched and unstretched an equal amount throughout the test including means for operably connecting said specimen to the member whereby the stretching and unstretching will tend to reciprocate the member in an irregular manner dependent upon the decreasing force exerted by the gradually weakening specimen upon the member and the irregularity in the action of the force, and other means tending to simultaneously reciprocate the member in a regular manner in a different direction, said means cooperating to produce a resultant reciprocation whereby a beam of light may be recordably reflected in an irregular manner responsive in its irregularities to the changing force exerted by the specimen and the irregularities in the action of the force.

15. In a testing machine, a resilient rod, means for anchoring the rod at one end, a reflector mounted on the opposite end of the rod, means tending to deflect the rod and reflector uniformly from and to initial position in one plane, means whereby a test specimen of the material to be tested may be stretched and unstretched including means for operably connecting said specimen to the rod whereby the stretching and unstretching will tend to deflect the rod and reflector from and to initial position in another plane, said means cooperating to produce a resultant deflection in the rod and the reflector whereby a beam of light may be recordably reflected depending in part upon the action of the specimen.

16. In a testing machine, a recordably operable member, means for inducing action in a test specimen of the material to be tested, other means, said means constituting a plurality of means for simultaneously operating the member whereby the resultant operation may be recorded, the resultant operation being effected in part by the induced action of the specimen whereby the resultant operation will be in part dependent on the action of the specimen, and means for regulating the timing of the operations of the before-mentioned means whereby they may be set to operate in any desired phase.

Signed at New York, county and State of New York, this 5th day of January, 1924.

JOSEPH G. COFFIN.